United States Patent
Bordow et al.

(10) Patent No.: US 11,973,755 B1
(45) Date of Patent: Apr. 30, 2024

(54) APPARATUSES, METHODS, AND COMPUTER PROGRAM PRODUCTS FOR OFFLINE AUTHENTICATION

(71) Applicant: Wells Fargo Bank, N.A., San Francisco, CA (US)

(72) Inventors: Peter Bordow, Fountain Hills, AZ (US); Jeff J. Stapleton, O'Fallon, MO (US); Ramesh Yarlagadda, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 453 days.

(21) Appl. No.: 17/389,915

(22) Filed: Jul. 30, 2021

(51) Int. Cl.
*H04L 9/40* (2022.01)

(52) U.S. Cl.
CPC ........ *H04L 63/0876* (2013.01); *H04L 63/102* (2013.01); *H04L 63/108* (2013.01); *H04L 63/20* (2013.01); *H04L 63/107* (2013.01)

(58) Field of Classification Search
CPC . H04L 63/0876; H04L 63/102; H04L 63/108; H04L 63/20; H04L 63/107
USPC .......................................................... 726/4
See application file for complete search history.

(56) References Cited

U.S. PATENT DOCUMENTS

| | | | |
|---|---|---|---|
| 7,724,924 B2 | 5/2010 | Didier et al. | |
| 8,595,806 B1* | 11/2013 | Gabrielson | G06F 21/629 709/227 |
| 9,665,832 B2 | 5/2017 | Thieberger et al. | |
| 10,572,641 B1 | 2/2020 | Griffin et al. | |
| 10,681,025 B2 | 6/2020 | O'Regan et al. | |
| 10,958,641 B2 | 3/2021 | Burmester et al. | |
| 11,048,794 B1 | 6/2021 | Bordow | |
| 2009/0164796 A1 | 6/2009 | Peirce | |
| 2010/0174914 A1 | 7/2010 | Shafir | |
| 2013/0219180 A1* | 8/2013 | Saino | H04L 9/3271 713/171 |
| 2018/0337923 A1* | 11/2018 | Tanimoto | G06F 21/305 |
| 2021/0011986 A1* | 1/2021 | Tussy | G07C 9/00 |
| 2021/0021601 A1 | 1/2021 | Valecha et al. | |
| 2021/0036856 A1 | 2/2021 | Wang et al. | |
| 2021/0176237 A1* | 6/2021 | Nishida | H04L 63/0853 |
| 2021/0288973 A1* | 9/2021 | Dimble | H04W 12/108 |
| 2021/0391994 A1* | 12/2021 | Johnson | G06Q 20/4014 |

(Continued)

*Primary Examiner* — Thanh T Le
(74) *Attorney, Agent, or Firm* — K&L Gates LLP

(57) ABSTRACT

A method, apparatus, and computer program product for offline authentication are provided. An example method includes receiving, by a computing device, a request for authentication from a first user device associated with a first user. The request includes first authentication credentials generated based upon user attributes retrieved by the first user device from a digital identity construct database at a first time. The method includes determining an offline condition of the computing device at a first time. The method also includes obtaining, by the computing device, second authentication credentials associated with the first user that are based upon one or more user attributes retrieved by the computing device from the digital identity construct database at a second time later than the first time. The method incudes determining a discrepancy between the first and second authentication credentials and authenticating the first user based upon a forecast operation of the same.

20 Claims, 7 Drawing Sheets

(56) References Cited

U.S. PATENT DOCUMENTS

| | | | |
|---|---|---|---|
| 2022/0014509 A1* | 1/2022 | Walters | H04L 63/0876 |
| 2023/0229745 A1* | 7/2023 | Narikawa | G06F 21/32 |
| | | | 726/19 |
| 2023/0308877 A1* | 9/2023 | Morchon | H04W 12/122 |

* cited by examiner

APPARATUSES, METHODS, AND COMPUTER PROGRAM PRODUCTS FOR OFFLINE AUTHENTICATION

TECHNOLOGICAL FIELD

Example embodiments of the present disclosure relate generally to authentication and, more particularly, to the use of a dynamic digital identity to provide offline authentication techniques.

BACKGROUND

Users often interact with a variety of businesses, merchants, financial institutions, and other entities, explicitly or implicitly, as part of their day-to-day lives. In doing so, an assortment of user data is generated that is tied to or representative of the underlying user. Furthermore, user's rely upon the security of the systems used for these interactions in order to keep their data safe. For example, systems may leverage authentication protocols or credentials in order to ensure that the user with which the system interacts is verified and has access to the features offered by the system. Often, network connectivity is required to perform various verification, authorization, and/or authentication operations.

BRIEF SUMMARY

As described above, authentication may be used in a variety of applications and industries to verify a session or otherwise validate interactions between users or devices. Traditional methods for authentication often rely upon a user to provide a password or other relatively static verifiable element that is used to confirm the identity of the user and generate a secure session with a requested entity (e.g., generate a session identifier that may be based upon the user's password or otherwise). These traditional techniques, however, have become increasingly susceptible to attack as the availability of computing power has increased, enabling exhaustive searching (e.g., Rainbow Tables or equivalent techniques). In this way, a user's session, password, etc. may be compromised simply by virtue of the new technical problems emergent in response to the growing computing resources available today, because perpetrators have a greater ability to breach a user's password or otherwise determine the method by which a session identifier is generated. Furthermore, conventional systems and methods for authenticating a user rely upon stagnant user credentials (e.g., a user inputted password or the like) that may be similarly susceptible to attack and/or require constant vigilance on the part of the user. For example, a user may be traditionally required to not only remember a unique password for use with each entity with which the user interacts but may also be required to diligently protect, update, and/or periodically change these passwords. Additionally, authentication, authorization, and/or verification techniques often require network connectivity in order to authenticate a user or session. For example, traditional systems often require network access in order to transmit user data to and receive user data from a remote server or other verified entity that serves to confirm the validity of user authentication credentials. Said differently, without network access, many conventional systems are incapable of properly authenticating a user, especially in instances in which user authentication credentials have changed.

To solve these issues and others, example implementations of embodiments of the present disclosure may leverage a digital identity construct database that provides a dynamic and evolving mechanism for authentication. In operation, a computing device described hereafter may receive a request for authentication from a first user device that includes authentication credentials generated based upon user attributes from a digital identity construct database at a first time (e.g., a current/up-to-date version of the digital identity construct of the first user). An offline condition of the computing device may be determined (e.g., intermittent or absent network connectivity) such that authentication credentials obtained for the first user by the computing device are from a second time (e.g., a prior or out-of-date version of the digital identity construct of the first user). The embodiments described herein may therefore determine a discrepancy between these authentication credentials and authenticate the user based upon a forecast operation performed between the authentication credentials.

In this way, the inventors have identified that the advent of computing resources have created a new opportunity for solutions for authentication which were historically unavailable. In particular, the embodiments herein may operate to address several technical challenges including providing a mechanism for offline authentication based upon evolving user attributes. Said differently, embodiments described herein may detect an offline condition of an authenticating device (e.g., computing device of the present disclosure) and authenticate a user in the absence of network connectivity (e.g., when updated authentication credentials are unavailable). These new offline authentication techniques may further leverage device interconnectivity, such as between multiple users and associated devices, to further increase the assurance associated with an authentication protocol. For example, in instances in which networking connectivity is absent, authentication credentials of additional users associated with the requesting user may be leveraged to ensure proper user verification.

Systems, apparatuses, methods, and computer program products are disclosed herein for offline authentication. In one embodiment, with reference to the claimed computer-implemented method, a method for offline authentication is provided. The method may include receiving, by a computing device, a request for authentication from a first user device associated with a first user. The request may include first authentication credentials generated based upon one or more user attributes retrieved by the first user device from a digital identity construct database at a first time. The one or more user attributes may include at least one static attribute that remains constant over time and ne dynamic attribute that varies over time. The method may include determining an offline condition of the computing device at the first time and obtaining, by the computing device, second authentication credentials associated with the first user. The second authentication credentials may be based upon one or more user attributes retrieved by the computing device from the digital identity construct database at a second time that is later in time than the second time. The method may further include determining a discrepancy between the first authentication credentials and the second authentication credentials and authenticating, by the computing device, the first user based upon a forecast operation between the second authentication credentials and the first authentication credentials.

In some embodiments, the second authentication credentials may be based upon at least one previously acquired iteration of the at least one static attribute of the first authentication credentials and at least one previously acquired iteration of the at least one dynamic attribute of the first authentication credentials.

In some further embodiments, the forecasting operation includes determining a time difference between the first time and the second time and projecting the at least one dynamic attribute of the first authentication credentials based upon the time difference and the at least one previously acquired iteration of the at least one dynamic attribute as used by the second authentication credentials.

In some embodiments, determining the offline condition of the computing device further includes generating, by the computing device, a request for updated credentials and attempting to transmit the request to the digital identity construct database. In such an embodiment, the method further includes determining the offline condition in an instance in which a transmission failure is determined.

In some further embodiments, the request for updated credentials may include a request for one or more user attributes from the digital identity construct database at the first time. Furthermore, a user device may capture new attributes of the user so as to update the digital identity construct. In doing so, new attributes or new iterations of previously-acquired attributes may also be used to improve the quality of user attributes or remove/replace attributes that are no longer applicable to the user so as to ensure that credentials generated based upon these attributes are accurate.

In some embodiments, the method further includes detecting, by the computing device, a second user device associated with a second user, wherein the second user device is proximate the first user device. In such an embodiment, the method may further include receiving third authentication credentials generated based upon one or more user attributes retrieved by the second user device from a digital identity construct database at a first time and authenticating, by the computing device, the first user based upon the third authentication credentials, the second authentication credentials, and the first authentication credentials.

In any embodiment, the computing device may be associated with an access location, and the method may further include providing access to the access location in response to authenticating the first user.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
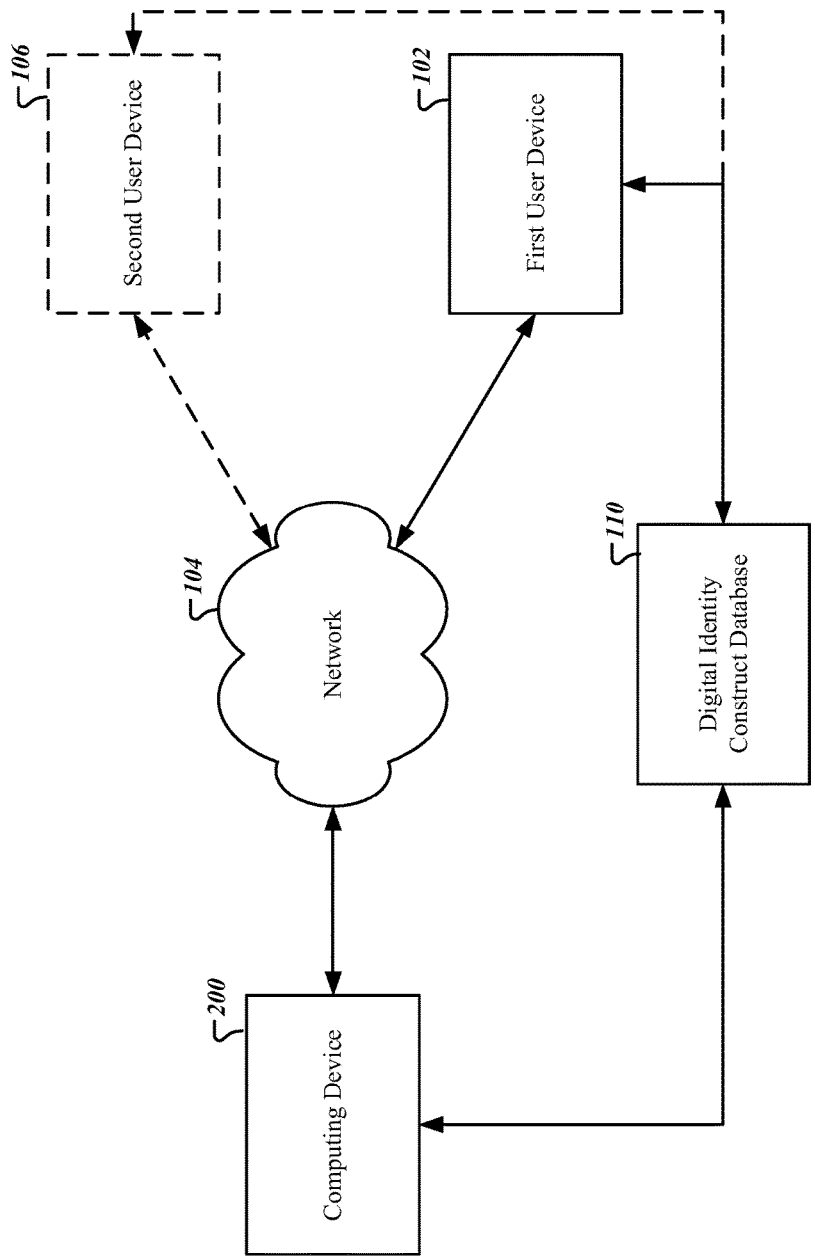
FIG. 1 illustrates a system diagram including devices that may be involved in some example embodiments described herein.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device as an example "apparatus." However, elements of the apparatus described herein may be equally applicable to the claimed method and computer program product. Thus, use of any such terms should not be taken to limit the spirit and scope of embodiments of the present disclosure.

Definition Of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computing device" refers to computer hardware that is configured (either physically or by the execution of software) to authenticate a user and associated user device(s) and, among various other functions, is configured to directly, or indirectly, transmit and receive data. An example computing device may include a smartphone, a tablet computer, a laptop computer, a local server, a wearable device (e.g., smart glasses, smart watch, or the like), and the like. In some embodiments, a computing device may include a "smart device" that is equipped with chip of other electronic device that is configured to communicate with a first user device and/or a second user device via Bluetooth, NFC, Wi-Fi, 3G, 4G, 5G, RFID protocols, and the like. By way of a particular example, a computing device may be associated with an access location (e.g., configured to authenticate a user to provide access to the access location) and may access a digital identity construct database as described hereafter to retrieve user attributes used in generating user authentication credentials. The computing device may be configured to communicate with the digital identity construct database (e.g., housed by a remote server or otherwise) via a Wi-Fi access point that is in communication with the digital identity construct. As described hereafter, the computing device may have intermittent or absent network connectivity during a request for authentication such that the computing device is unable to receive updated user attributes from the digital identity construct database.

As used herein, the terms "first user device," "first mobile device," "first electronic device," and the like refer to computer hardware that is configured (either physically or by the execution of software) to access one or more services made available by the computing device (e.g., apparatus of the present disclosure) and, among various other functions, is configured to directly, or indirectly, transmit and receive data. Example first user devices may include a smartphone, a tablet computer, a laptop computer, a wearable device (e.g., smart glasses, smart watch, or the like), and the like. In some embodiments, a first user device may include a "smart device" that is equipped with chip of other electronic device that is configured to communicate with the computing device and/or second user device via Bluetooth, NFC, Wi-Fi, 3G, 4G, 5G, RFID protocols, and the like. By way of a particular example, a first user device may be a mobile phone equipped with a Wi-Fi radio that is configured to communicate with a Wi-Fi access point that is in communication with the computing device 200 or other computing device via a network. As described hereafter, the first user device may be configured to communicate (e.g., transmit and receive data) with a digital identity construct database (e.g., housed by a remote server or otherwise) via a Wi-Fi access point that is in communication with the digital identity construct database so as to receive update user authenticate credentials (e.g., current user attributes for the first user).

The "first user device" may, in some embodiments define, include, access, or otherwise leverage one or more sensing devices or sensors. For example, the first user device may include one or more cameras, infrared (IR) sensors, scanning devices, imagers, accelerometers, gyroscopes, positional sensors, heartrate sensors, temperature sensors, pressure sensors, positional sensors, and/or the like configured to generate user data associated with or indicative of the first user. The one or more sensing devices or sensors may be configured to generate user data associated with first user attributes (e.g., dynamic or static) as defined herein. The present disclosure contemplates that any example first user device may include any number of sensing devices without limitation.

As used herein, the terms "second user device," "second mobile device," "second electronic device," and the like refer to computer hardware that is configured (either physically or by the execution of software) to access one or more services made available by the computing device (e.g., apparatus or computing device of the present disclosure) and, among various other functions, is configured to directly, or indirectly, transmit and receive data. Example second devices may include a smartphone, a tablet computer, a laptop computer, a wearable device (e.g., smart glasses, smart watch, or the like), and the like. In some embodiments, a second user device may include a "smart device" that is equipped with chip of other electronic device that is configured to communicate with the computing device and/or first user device via Bluetooth, NFC, Wi-Fi, 3G, 4G, 5G, RFID protocols, and the like. By way of a particular example, a second user device may be a mobile phone equipped with a Wi-Fi radio that is configured to communicate with a Wi-Fi access point that is in communication with the computing device 200 or other computing device via a network. As described hereafter, the second user device may be configured to communicate (e.g., transmit and receive data) with a digital identity construct database (e.g., housed by a remote server or otherwise) via a Wi-Fi access point that is in communication with the digital identity construct so as to receive update user authenticate credentials (e.g., current user attributes for the second user).

The "second user device" may, in some embodiments define, include, access, or otherwise leverage one or more sensing devices or sensors. For example, the second user device may include one or more cameras, infrared (IR) sensors, scanning devices, imagers, accelerometers, gyroscopes, positional sensors, heartrate sensors, temperature sensors, pressure sensors, positional sensors, and/or the like configured to generate user data associated with or indicative of the second user. The one or more sensing devices or sensors may be configured to generate user data associated with second user attributes (e.g., dynamic or static) as defined herein. The present disclosure contemplates that any example second user device may include any number of sensing devices without limitation.

As used herein, the terms "digital identity construct" and "digital identity construct database" refer to a data structure or repository for storing user attributes. The digital identity construct database may, for example, include a plurality of static attributes and dynamic attributes. As such, "static" attributes may refer to data entries associated with user attributes that may remain constant over time. By way of example, a static attribute may include dates, locations, addresses, and/or the like indicative of events (e.g., birthdays, first car purchase, most recent mailing addresses, or the like) that do not change. Alternatively, "dynamic" attributes may refer to data entries associated with user attributes that may vary over time. By way of example, a dynamic data attribute may include biometric features (e.g., age, weight, height, hair color, etc.), current location data, and/or the like that are capable of changing as, for example, a user ages, moves, etc. The present disclosure contemplates that the digital identity construct may include any number of user attributes associated with any number of respective users and may operate to, in some embodiments, store substantially all identifying data attributes, events, or the like associated with a particular user. Said differently, the present disclosure contemplates that the digital identity construct database may store any feature, data entry, element, data object, etc. associated with a user without limitation so as to form a substantially complete digital representation of the user's identity. For example, the digital identity construct and digital identity database may encompass, include, or otherwise access an identity system or identity databank, such as those described in U.S. patent application Ser. No. 16/268,288.

The digital identity construct database may be, for example, initially populated or otherwise supplied with user data as part of an initial set up procedure. For example, a first and/or second user may supply information (e.g., static or dynamic) about the respective user as part of an account set up procedure. Additionally or alternatively, the digital identity construct may be populated, updated, modified, or the like over time to provide an evolving repository of user attributes. For example, one or more static user attributes may be added to the digital identity construct database over time (e.g., new biometric data entries, new locations, new addresses, new financial transactions, etc.) and one or more dynamic user attributes may be updated or modified over time (e.g., current location, current job, new height, new weight, new hair color, etc.). In some instances, user attributes may be added or updated in the digital identity construct database in response to actions on the part of the user, such as input by the user in response to a request. In other embodiments, attributes may be added or updated in the digital identity construct automatically or otherwise without affirmative action on the part of the associated user. By way of example, a user may interact with an automated teller machine (ATM) and may input user attributes associated with the user (e.g., a request for an updated address, phone number, etc.). The ATM (e.g., second user device) may include, for example, one or more sensors (e.g., cameras, scanners, scales, microphones, or the like) configured to determine user attributes (e.g., hair color, weight, etc.) and may update the digital identity construct database accordingly. The present disclosure contemplates that any mechanism for supplying user attributes to the digital identity construct (e.g., social media scraping, location data monitoring, transaction history analysis, data processing, etc.) may be used without limitation.

The International Organization for Standardization (ISO) standard ISO/IEC 24760-1:2011-Security techniques—A framework for identity management—Part 1: Terminology and Concepts, defines identity as a set of attributes related to an entity. As such, the digital identity construct and digital identity construct database described herein may be configured such that digital identity is information (e.g., attributes) that may be used to represent an entity. Thus the digital identity construct that includes dynamic user attributes is a set of attributes that may change over time such that the most current version of user attributes be used for generating user authentication credentials for online authentication while the most recent user attributes (e.g., the most recent iteration of a dynamic user attribute) may be used to generate use authentication credentials for offline authentication.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a computing device 200) communicably connected via a network 104 to a first user device 102 and, in some embodiments, a second user device 106. The example system 100 may also include a digital identity construct database 110 that, when networking connectivity is provided, may be communicably coupled with the computing device 200. Such a digital identity construct database 110 may also be accessible by the first user device 102 and/or the second user device 106.

The computing device 200 may include circuitry, networked processors, or the like configured to perform some or all of the apparatus-based (e.g., computing device-based) processes described herein, and may be any suitable network server and/or other type of processing device. In this regard, computing device 200 may be embodied by any of a variety of devices. For example, the computing device 200 may be configured to receive data (e.g., user attribute data, sensor data, sensing data, etc.) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the computing device 200 may be located remotely from the first user device 102, second user device 106, and/or digital identity construct database 110. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols. As described hereafter, network connectivity between the computing device 200 and the digital identity construct database 110 via the network 104 may vary in quality or duration (e.g., intermittent connectivity) and/or may be absent during an attempt to authenticate a user by the computing device 200.

The first user device 102 may be associated with a first user and may be configured to generate and/or access user attribute data associated with the first user. Although a single user device associated with a corresponding user is shown, the example system 100 may include any number of user devices that may be associated with various users. The first user device 102 may be a cellular telephone (e.g., a smartphone and/or other type of mobile telephone), laptop, tablet, electronic reader, e-book device, media device, wearable, smart glasses, smartwatch, mobile device, any combination of the above, or any device by which the first user may access the computing device 200, the digital identity construct database 110, or the like. In some embodiments, the first user device 102 may be configured to request authentication (e.g., from the computing device 200). The first user device 102 may also allow a user to provide input (e.g., by way of a biometric scan, actionable notification, or the like) via sensing devices or sensors, which may be conveyed to the computing device 200 via the network 104 as attribute data. User data or attribute data may be, as described above, generated via one or more input devices, sensing devices, or sensors, including, without limitation, a touchscreen, microphone, camera, optical scanner, fingerprint reader, and/or motion sensor device (e.g., an accelerometer, gyroscope, etc.).

The second user device 106 may be associated with a second user and may be configured to generate and/or access user attribute data associated with the second user. Although a single user device associated with a corresponding user is shown, the example system 100 may include any number of user devices that may be associated with various users. The second user device 106 may be a cellular telephone (e.g., a smartphone and/or other type of mobile telephone), laptop, tablet, electronic reader, e-book device, media device, wearable, smart glasses, smartwatch, mobile device, any combination of the above, or any device by which the second user may access the computing device 200, the digital identity construct database 110, or the like. In some embodiments, the second user device 106 may be configured to request authentication (e.g., from the computing device 200). The second user device 106 may also allow a user to provide input (e.g., by way of a biometric scan, actionable notification, or the like) via sensing devices or sensors, which may be conveyed to the computing device 200 via the network 104 as attribute data. User data or attribute data may be, as described above, generated via one or more input devices, sensing devices, or sensors, including, without limitation, a touchscreen, microphone, camera, optical scanner, fingerprint reader, and/or motion sensor device (e.g., an accelerometer, gyroscope, etc.).

The digital identity construct database 110 may be stored by any suitable storage device configured to store some or all of the information described herein (e.g., a separate memory system separate from the computing device 200, such as one or more database systems, backend data servers, network databases, cloud storage devices, or the like provided by a second user device 106 or the first user device 102). The digital identity construct database 110 may comprise data received from the computing device 200 (e.g., via a memory 204 and/or processor(s) 202) or the first user device 102, and the corresponding storage device may thus store this data. To avoid unnecessarily overcomplicating the disclosure, the digital identity construct database 110 is shown and described as a separate database, despite the fact that they may each be hosted by any number of specific physical devices, together or separately.

Figure 2:
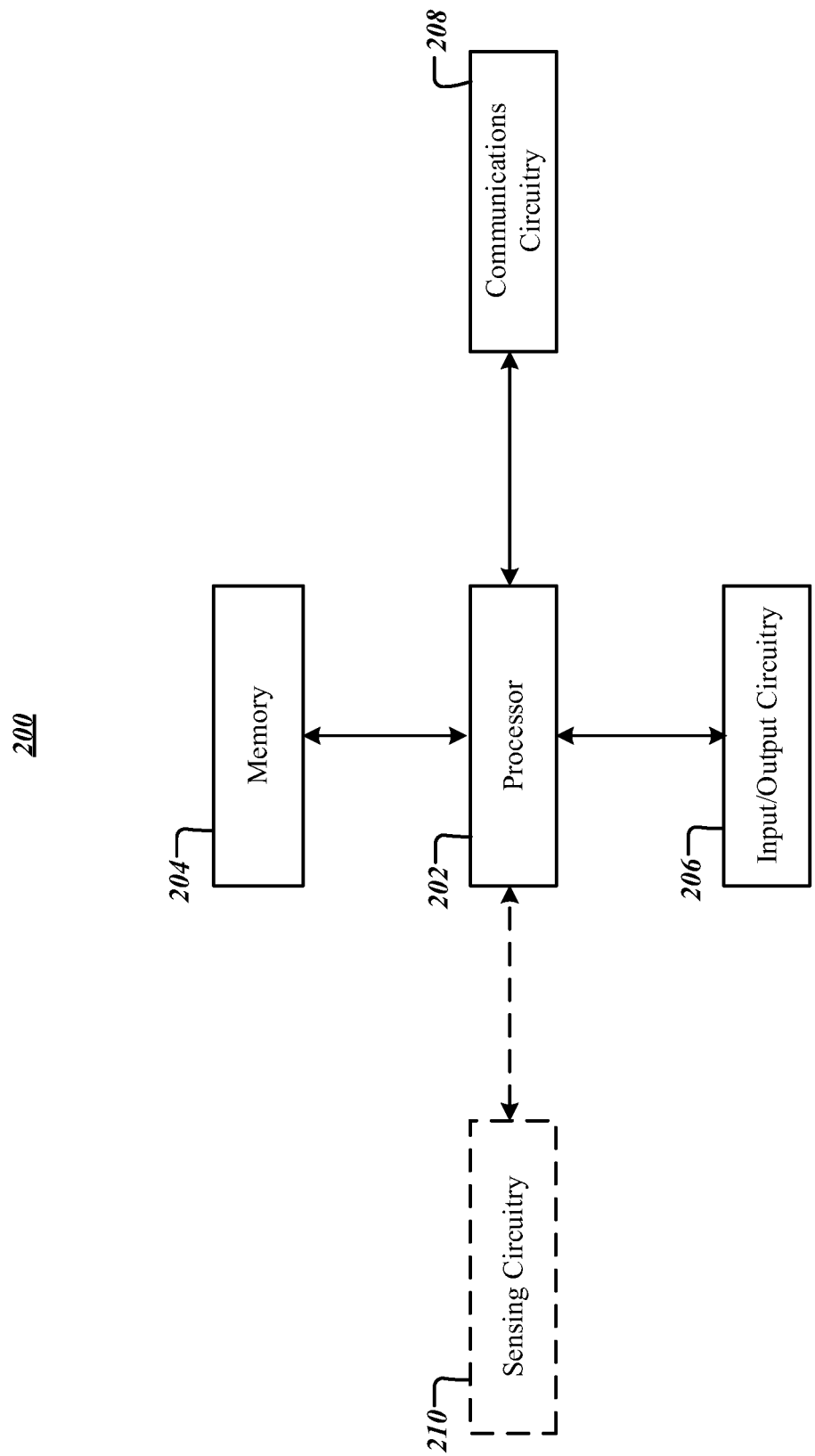
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, computing device 200 may include sensing circuitry 210. The computing device 200 may be configured to execute the operations described below in connection with FIGS. 3-6. Although components 202-210 are described in some cases using functional language, it should be understood that the particular implementations necessarily include the use of particular hardware. It should also be understood that certain of these components 202-210 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within one or more of the first user device 102 or the second user device 106. As indicated previously, it will be understood in this regard that some of the components described in connection with the computing device 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source (e.g., so as receive user attribute data or sensor data). In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 may be configured to control one or more functions of a display through computer program instructions (e.g., software and/or firmware) stored on a memory accessible to the processor (e.g., memory 204, and/or the like), so as receive user attribute data and/or sensor data.

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Sensing circuitry 210 includes hardware components designed to either generate sensor data or to analyze sensor data, such as data generated by one or more sensing devices of the first user device 102 and/or the second user device 106. For example, sensing circuitry 210 may include hardware components configured to perform image processing. Sensing circuitry 210 may utilize processing circuitry, such as the processor 202, to perform its corresponding operations, and may utilize memory 204 to store collected information. It should also be appreciated that, in some embodiments, the sensing circuitry 210 may include a separate processor, specially configured field programmable gate array (FPGA), or application specific interface circuit (ASIC) to perform its corresponding functions.

In addition, computer program instructions and/or other type of code may be loaded onto a computer, processor or other programmable computing device's circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Offline Authentication

Figure 3:
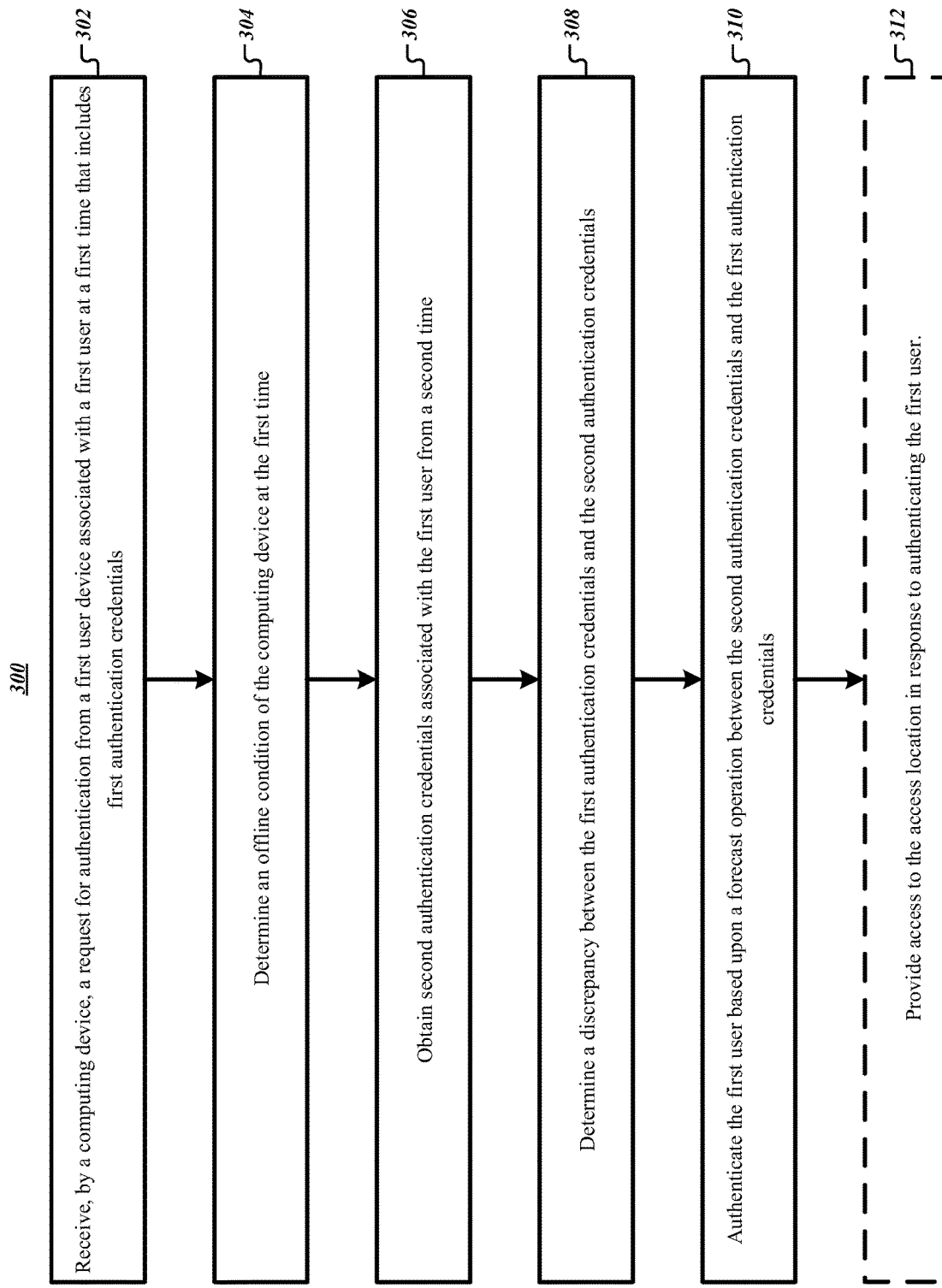
FIG. 3 illustrates an example flowchart for offline authentication, in accordance with some example embodiments described herein.

FIG. 3 illustrates a flowchart containing a series of operations for offline authentication. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or sensing circuitry 210.

As shown in operation 302, the apparatus (e.g., computing device 200) includes means, such as input/output circuitry 206, communications circuitry 208, or the like, for receiving a request for authentication from the first user device 102 associated with a first user. As described herein, the computing device 200 may be associated with an access location such that the computing device 200 operates to authenticate users and associated user devices to provide access to said access location. By way of a non-limiting example, the computing device 200 may be associated with a door, gate, or the like of a user's vacation home, rental property, or other location that may, for example, be subject to intermittent network connectivity, power supply, or the like. Although described hereafter with reference to a remote location, the present disclosure contemplates that the computing device 200 may be associated with any location, device, system, or the like without limitation.

In some example embodiments, the communications circuitry 208 of the computing device 200 may receive a request for authentication from a first user device 102. By way of example, the first user device 102 may request access to the location associated with the computing device 200 and the location may require authentication before providing access. In such an embodiment, the first user may attempt to access the location by transmitting a request for access to the computing device 200 via network 104. In other embodiments, the computing device 200 may detect the presence of the first user device 102 (e.g., via proximity sensors, connection with the network 104, or the like) and transmit a notification to the first user device 102 that includes requirements for accessing the location associated with the computing device 200. For example, the computing device 200 may transmit a notification to the first user device 102 prompting the first user to input a password or other authentication credential in order to receive access to the location associated with the computing device 200. Alternatively, however, the input/output circuitry 206 may receive the request for authentication from direct user interaction with the computing device 200.

The request for authentication at operation 302 may include first authentication credentials generated based upon one or more user attributes retrieved by the first user device 102 from a digital identity construct database 110 at a first time. As described above, the digital identity construct database 110 may store any feature, data entry, element, data object, etc. associated with the first user without limitation so as to form a substantially complete digital representation of the user's identity. The first time may also refer to the time at which the request for authentication is received such that the first time refers to a current or up-to-date version of the digital identity construct database 110 for the first user. Said differently, the first user device 102 may, via network 104, transmit data to and receive data from the digital identity construct database 110 such that the user attributes (e.g., at least one static and at least one dynamic attribute) received by the first user device 102 from the digital identity construct database 110 are similarly current or up-to-date.

The user attributes used in generating the first authentication credentials may, for example, be determined based upon the computing device 200. By way of example, the password for the first user to access the access location associated with the computing device 200 may be based upon the first user's first home address (e.g., a static attribute) and the user's current hair length (e.g., a dynamic attribute). At the first time (e.g., substantially current or real time associated with the request), in some embodiments, the first user device 102 may query the digital identity construct database 110 and retrieve the first user's home address and the user's current hair length. In other embodiments, the first user device 102 may, for example, request that the first user input one or more user attributes, such as a request that the user input his or her first home address. Additionally or alternatively, the first user device 102 may, via one or more sensing devices or sensors, capture images of the first user (e.g., via a camera of the first user device 102) and determine one or more user attributes of the first user (e.g., image processing to determine the first user's current hair length). The digital identity construct database 110 and/or the first user device 102 may generate first authentication credentials based upon the at least one static attribute and the at least one dynamic attribute determined for the first user. Although described hereinafter with reference to a static user attribute of a user's first home address and a dynamic attribute of a user's current hair length, the present disclosure contemplates that any user attribute of any number or type may be used at operation 302 based upon the intended application of the computing device 200 and/or the sensing devices of the user device 102.

In instances in which the user attribute (e.g., static or dynamic) is associated with a location (e.g., global positioning system (GPS) coordinates or the like), a date (e.g., birthdate, date of first car purchase, etc.) or numerical biometric feature (e.g., weight, height, etc.) or the like, the generation of the portion of the first authentication credentials for this attribute may refer to the numerical value associated with the attribute. In other embodiments in which the user attribute is not associated with a numerical value (e.g., a user's hair color, type of car owned, city of current location, etc.), the digital identity construct database 110 and/or the first user device 102 may employ one or more hash functions, randomization functions, binarizing operations, or other techniques configured to convert non-numerical elements into associated numerical values. The digital identity construct database 102 and/or the first user device 102 may, for example, perform any mathematical transformation based on the numerical values of the determined attributes. For example, the mathematical operation, in some embodiments, may comprise a multiplication of the value associated with the determined static attribute with the value associated with the determined dynamic attribute.

The present disclosure contemplates that any number of mathematical operations and combinations of mathematical operations (e.g., multiplication, addition, subtraction, division, exponential functions, logarithmic functions, etc.) may be used to generate the first authentication credentials at operation 302 such that the generated first authentication credentials are of near-infinite scope and degree. Furthermore, the present disclosure contemplates that the numerical values obtained from the static attribute and the dynamic attribute (e.g., or a plurality of the same) may, based upon the size of these numerical values, operate to increase the assurance associated with the first authentication credentials. For example, increasing the number of selected attributes and/or the values of these attributes (e.g., GPS coordinates or the like) operates to substantially increase the complexity of the generated first authentication credentials.

In some example embodiments, the user attributes used to generate the first authentication credentials may be randomly or pseudo-randomly selected for each interaction with the computing device 200, such as instances in which the computing device 200 accesses a plurality of static attributes and a plurality of dynamic attributes. The selection of user attributes (e.g., at least one static and at least one dynamic attribute) may include implementing a random or pseudo-random selection protocol that identifies at least one static attribute and at least one dynamic attribute. By way of example, in some embodiments, once a dynamic or static attribute is selected, a selection frequency for each user attribute may be monitored such that the likelihood that an unselected attribute is selected on subsequent determinations is increased until the unselected attributed is used. Although an example frequency calculation procedure is described herein, the present disclosure contemplates that any pseudo-random number generation algorithm (e.g., a middle-square method, mersenne twister, inversive congruential generator, lagged Fibonacci generator, linear feedback shift register or the like) may additionally or alternatively be used to pseudo-randomly determine the at least one static attribute and the at least one dynamic attribute without departing from the scope of the disclosure.

Thereafter, in operation 304, the apparatus (e.g., computing device 200) may further include means, such as the input/output circuitry 206, communications circuitry 208, or the like for determining an offline condition of the computing device at the first time. As described hereafter with reference to FIG. 4, the computing device 200 may, at the first time, lack network connectivity with respect to the digital identity construct database 110 and be unable to retrieve current user attributes so as to generate the first user authentication credentials (e.g., reproduce the first authentication credentials for comparison purposes). By way of continued example, the computing device 200 may be associated with an access location that has intermittent network connectivity such that the computing device 200 may retrieve user attributes from the digital identity construct database in order to generate authentication credentials for the first user; however, this connectivity may not always be present resulting in prior versions of user attributes for the first user. These out-of-date user attributes may result in dated user authentication credentials (e.g., second user authentication credentials as described hereafter) that do not match user authentication credentials based on current user attributes (e.g., first user authentication credentials). Therefore, at operation 304, the computing device may at the first time (e.g., at the time of the request for authentication by the first user device) attempt to transmit data to and receive data from the digital identity construct database 110 but be unable to receive such data (e.g., unable to receive updated user attributes). This failure in transmission (e.g., a failed request for updated user attributes) may indicate an offline condition for the computing device 200 at the first time.

Thereafter, as shown in operation 306, the apparatus (e.g., computing device 200) includes means, such as processor 202 or the like, for obtaining second authentication credentials associated with the first user. As described above, the computing device 200 may, at a second time that is earlier in time than the first time (e.g., prior to the request for authentication), may be communicably coupled with the digital identity construct database 110 so as to receive user attributes and associated authentication credentials therefrom. Said differently, prior to the request for authentication at operation 302, the computing device 200 may at least once have access to the digital identity construct database 110 to retrieve user attributes so as to obtain user authentication credentials in light of the same. As such, at operation 306, the computing device 200 may obtain second authentication credentials that are based upon at least one previously acquired iteration of the at least one static attribute of the first authentication credentials and at least one previously acquired iteration of the at least one dynamic attribute of the first authentication credentials. By way of continued example, the computing device 200 may obtain a previously acquired iteration of the user's first home address (e.g., static user attribute) and a previously acquired iteration of the user's current hair length (e.g., current as of the second time when the user attribute is stored by the digital identity construct database 110 and received by the computing device 200) and generate second authentication credentials based upon the same.

Similar to operation 302, in instances in which the user attribute (e.g., static or dynamic) is associated with a location (e.g., global positioning system (GPS) coordinates or the like), a date (e.g., birthdate, date of first car purchase, etc.) or numerical biometric feature (e.g., weight, height, etc.) or the like, the generation of the second authentication credentials for this attribute may refer to the numerical value associated with the attribute. In other embodiments in which the user attribute is not associated with a numerical value (e.g., a user's hair color, type of car owned, city of current location, etc.), the computing device 200 may employ one or more hash functions, randomization functions, binarizing operations, or other techniques configured to convert non-numerical elements into associated numerical values. In the generation of the verified authentication credential, the computing device 200 may, for example, perform any mathematical transformation based on the numerical values of the previous iterations of the user attributes. For example, the mathematical operation, in some embodiments, may comprise a multiplication of the value associated with the previous iteration of the static attribute with the value associated with the pervious iteration of the dynamic attribute.

Thereafter, as shown in operation 308, the apparatus (e.g., computing device 200) includes means, such as processor 202 or the like, for determining a discrepancy between the first authentication credentials and the second authentication credentials for the first user. As described above with reference to operation 304, the computing device 200 may lack network connectivity or be otherwise unable to access the digital identity construct database 110 (e.g., an offline condition of the computing device 200) such that the second authentication credentials are based upon user attributes of the first user from a second time (e.g., prior in time to the first time). As such, the computing device 200 may compare the second authentication credentials with the first authentication credentials and determine a discrepancy in an instance in which the first authentication credentials are not substantially the same as the second authentication credentials. Said differently, the computing device 200 may determine that the user attributes from the second time used by the computing device 200 in generating the second authentication credentials (e.g., out-of-date user attributes) differ from the user attributes used in generating the first authentication credentials at the first time (e.g., current user attributes).

Thereafter, as shown in operation 310, the apparatus (e.g., computing device 200) includes means, such as processor 202 or the like, for authenticating the first user based upon a forecast operation between the second authentication credentials and the first authentication credentials. As described hereafter with reference to FIG. 5, the computing device 200 may be configured to determine a time difference between the second time and the first time. By way of example, the computing device 200 may, in periodically obtaining second user authentication credentials via transmissions with the digital identity construct database 110, timestamp or otherwise assign a time value to the second authentication credentials. The request for authentication from the first user device 102 may also include a time associated with the request (e.g., the first time). The computing device 200 may determine the difference between the first time and the second time as the mathematical difference between these time values.

The computing device 200 may further perform a forecast operation by projecting the at least one dynamic attribute of the first authentication credentials based upon the determined time difference and the at least one previously acquired iteration of the at least one dynamic attribute as used by the second authentication credentials. Given that the static attribute as used in generating the first authentication credentials and the static attribute as used in obtaining the second authentication credentials do not vary with respect to time, the portion of the first and the second authentication credentials based upon these static attributes may be substantially identical between authentication credentials. Given that the dynamic attributes vary with respect to time (e.g., height, weight, age, hair color, hair length, etc.), the computing device may utilize the time difference to project the dynamic user attribute used in generating the first authentication credentials. With reference to an example age related dynamic user attribute, this projection may refer to the addition of the time difference to the age of the first user at the second time to project the age of the user at the first time. Further examples are described hereafter with reference to FIG. 5.

In some embodiments, as shown in operation 312, the apparatus (e.g., computing device 200) includes means, such as processor 202, communications circuitry 208, or the like, for providing access to the access location in response to authenticating the first user. As described above, the computing device 200 may be associated with an access location (e.g., door, gate, etc.) or otherwise be configured to authenticate a user and subsequently provide access to the location based upon this authentication. By way of continued example, the computing device 200 may be associated with a remote location that lacks consistent network connectivity (e.g., vacation property, rental property, or the like). In response to operation 310 in which the computing device 200 authenticates the first user, the computing device 200 may provide access to the physical location associated with the computing device 200 by, for example, opening a locked door, gate, or the like. Although described herein with reference to physical access, the present disclosure contemplates that the access provided at operation 312 may refer to system access, network, access, application access, or the like. Said differently, the access operations described herein may refer to authorization operations of the described system. Said differently, the operations of FIG. 3 may authenticate the first user and/or first user device 102 (e.g., confirm the identity of the first user); however, the system may further authorize one or more actions for the first user and/or first user device 102 (e.g., providing access as an example authorization).

Figure 4:
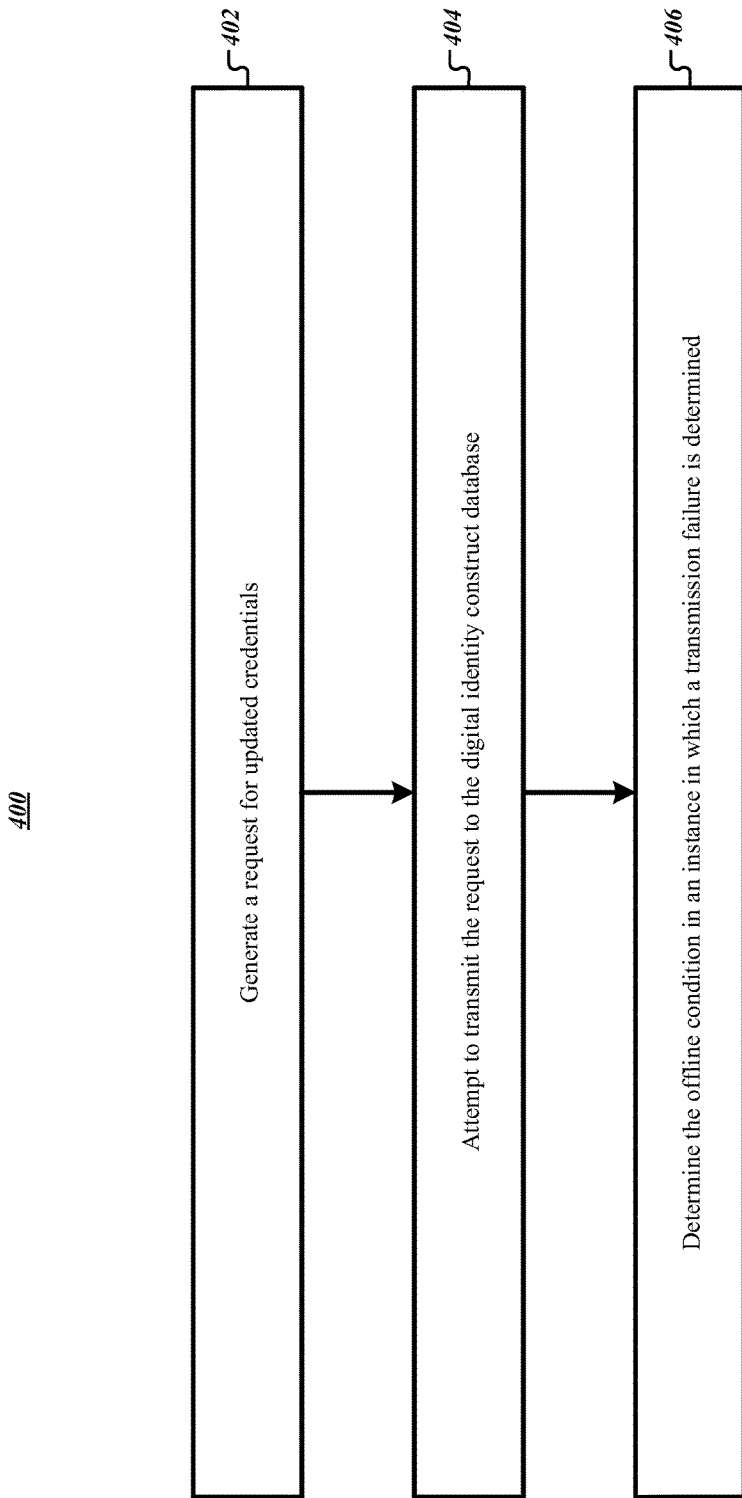
FIG. 4 illustrates an example flowchart for offline device determinations, in accordance with some example embodiments described herein.

Turning next to FIG. 4, a flowchart is shown for offline device determinations. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or sensing circuitry 210.

As shown in operation 402, the apparatus (e.g., computing device 200) includes means, such as input/output circuitry 206, communications circuitry 208, processor 202, or the like, for generating a request for updated credentials. As described above, the computing device 200 may receive a request for authentication that includes first authentication credentials based upon user attributes received or generated at a first time (e.g., current time). In order to attempt to authenticate the first user, the computing device 200 may generate a request for updated credentials for transmission to the digital identity construct database 110 that requests the current versions of the user attributes associated with the first user. The request for updated credentials, as described herein, may include a request for one or more user attributes from the digital identity construct database at the first time (e.g., an attempt to receive current user attributes from the digital identity construct 200 by the computing device 200).

Thereafter, as shown in operation 404, the apparatus (e.g., computing device 200) includes means, such as input/output circuitry 206, communications circuitry 208, processor 202, or the like, for attempting to transmit the request to the digital identity construct database 110. Given that the computing device 200 may only have intermittent network access, the computing device may, at the first time, be unable to transmit the request for updated credentials to the digital identity construct database. In some embodiments, the digital identity construct database 110 may be configured to periodically transmit updated user attributes (e.g., current credentials) to the computing device 200. In such an embodiment, the digital identity construct database 110 may attempt to transmit the updated user attributes at operation 404. Thereafter, as shown in operation 406, the apparatus (e.g., computing device 200) includes means, such as processor 202 or the like, for determining the offline condition in an instance in which a transmission failure is determined. In instances in which the transmission generated at operation 402 is attempted to be provided by the computing device 200, the transmission failure may, for example, occur after the expiration of a determined amount of time. In instances in which the transmission is provided by the digital identity construct database 110, the transmission failure may occur, for example, in an instance in which the digital identity construct database 110 fails to receive a responsive communication from the computing device 200.

Figure 5:
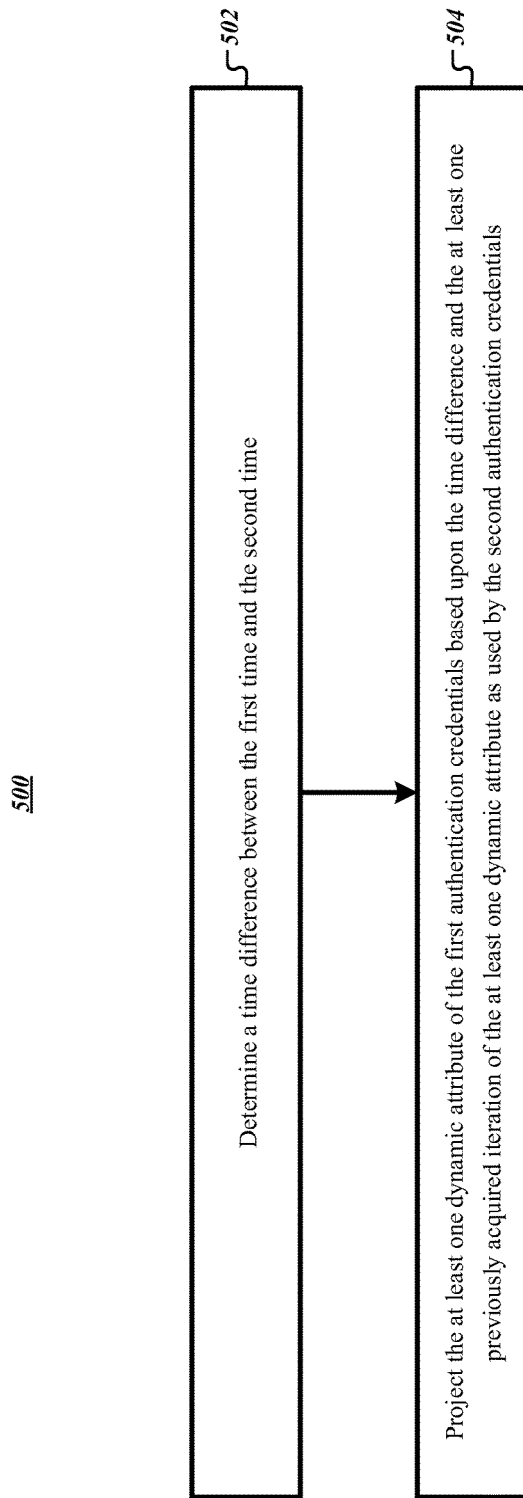
FIG. 5 illustrates an example flowchart for example forecasting operations, in accordance with some example embodiments described herein.

Turning next to FIG. 5, a flowchart is shown for example forecasting operations. The operations illustrated in FIG. 5 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or sensing circuitry 210.

As shown in operation 502, the apparatus (e.g., computing device 200) includes means, such as processor 202 or the like, for determining a time difference between the second time and the first time. As described above, the computing device 200 may, in periodically obtaining second user authentication credentials via transmissions with the digital identity construct database 110, timestamp or otherwise assign a time value to the second authentication credentials. The request for authentication from the first user device 102 may also include a time value associated with the request (e.g., the first time). The computing device 200 may determine the difference between the first time and the second time as the mathematical difference between these time values at operation 502.

As shown in operation 504, the apparatus (e.g., computing device 200) includes means, such as processor 202 or the like, for projecting the at least one dynamic attribute of the first authentication credentials based upon the time difference and the at least one previously acquired iteration of the at least one dynamic attribute as used by the second authentication credentials. As described above, the computing device 200 may perform a forecast operation by projecting the at least one dynamic attribute of the first authentication credentials based upon the determined time difference and the at least one previously acquired iteration of the at least one dynamic attribute as used by the second authentication credentials. Given that the static attribute as used in generating the first authentication credentials and the static attribute as used in obtaining the second authentication credentials do not vary with respect to time, the portion of the first and the second authentication credentials based upon these static attributes may be substantially identical between authentication credentials. Said differently, a forecasting operation or projection associated with a user attribute that is unchanged over time (e.g., a static user attribute) is unnecessary due to the nature of the user attribute.

Given that the dynamic attributes vary with respect to time (e.g., height, weight, age, hair color, hair length, etc.), however, the computing device may utilize the time difference to project the dynamic user attribute used in generating the first authentication credentials. By way of continued example to a dynamic user attribute associated with a user's current hair length, the projection may refer to an estimation of the user's hair growth during the time period between the first time and the second time. The computing device 200 may, for example, leverage user data indicative of the change associated with this user attribute including location data of the first user device 102 proximate locations associated with salons, barbers, etc., user transaction data associated with transactions with the same, social media data regarding the same, one or more images captured by sensing devices (e.g., cameras) of the user device, and/or the like. Said differently, the present disclosure contemplates that the computing device 200 may access, analyze, or otherwise use user data of any kind to perform the projection and forecasting operations of FIG. 5.

Figure 6:
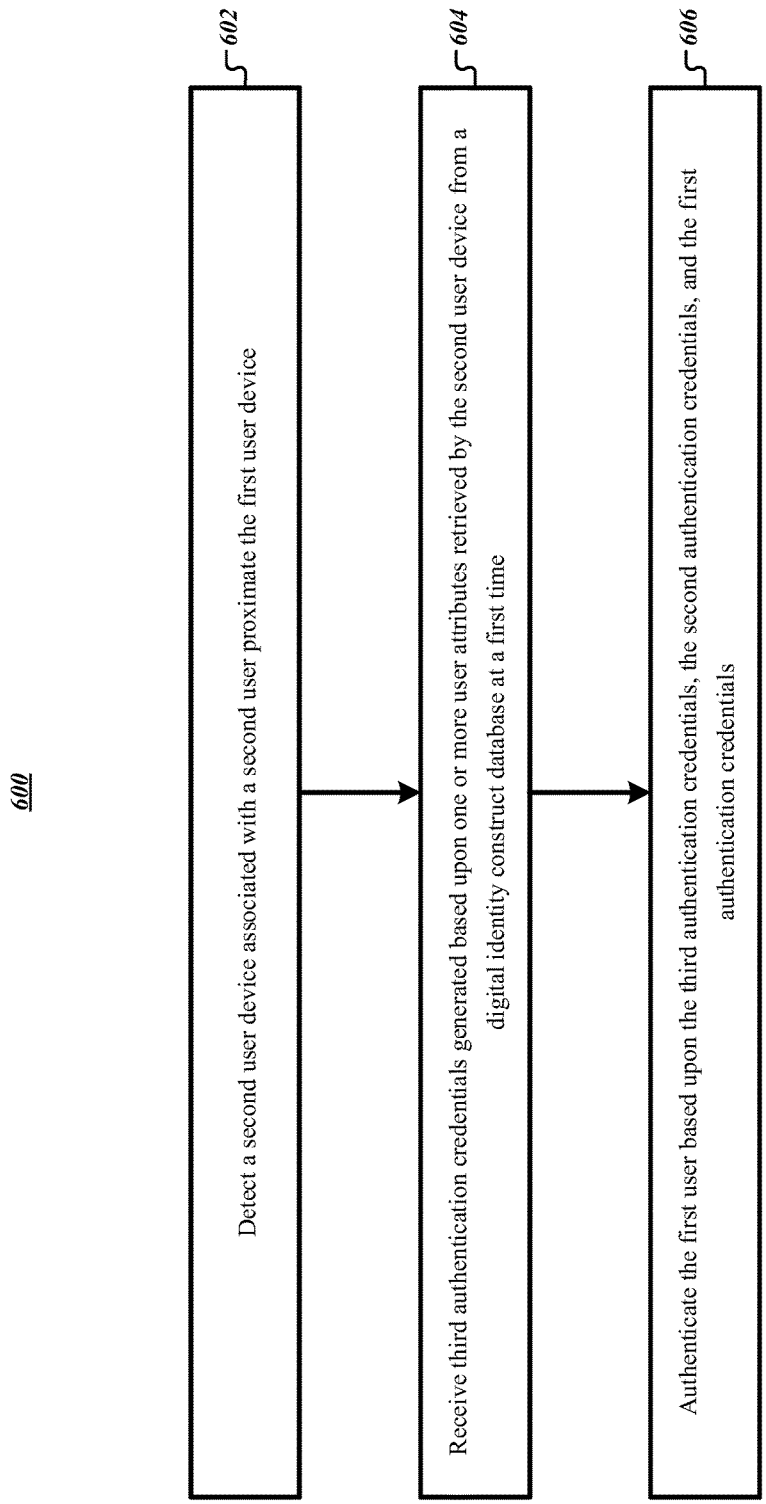
FIG. 6 illustrates an example flowchart for multi-user implementations, in accordance with some example embodiments described herein.

Turning next to FIG. 6, a flowchart is shown for example multi-user implementations. The operations illustrated in FIG. 6 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, and/or sensing circuitry 210.

As shown in operation 602, the apparatus (e.g., computing device 200) includes means, such as input/output circuitry 206, communications circuitry 208, processor 202, or the like, for detecting a second user device 106 associated with a second user, wherein the second user device is proximate the first user device 102. In order to further improve assurances associated with the offline authentication techniques described herein, the operations of FIG. 6 may further leverage device interconnectivity, such as between the first user device 102 and the second user device 106. By way of example, a second user and second user device 106 may be determined to be associated with the first user and proximate the first user device 102. By way of a particular example, a first user (e.g., husband) and a second user (e.g., spouse) may travel together to a remote location (e.g., vacation property or the like) such that these users may be located proximate to one another and, based upon user attributes in the digital identity construct database 110, may further be associated with one another. The computing device 200 may detect the second user device 106 by, for example, being communicably coupled with the computing device 200 via the network 104.

Thereafter, as shown in operation 604, the apparatus (e.g., computing device 200) includes means, such as processor 202 or the like, for receiving third authentication credentials generated based upon one or more user attributes retrieved by the second user device 102 from a digital identity construct database 110 at a first time. Similar to operation 302, the digital identity construct database 110 may store any feature, data entry, element, data object, etc. associated with the second user without limitation so as to form a substantially complete digital representation of the second user's identity. The first time may similarly refer to the time at which the request for authentication is received such that the first time refers to a current or up-to-date version of the digital identity construct database 110 for the second user. Said differently, the second user device 106 may, via network 104, transmit data to and receive data from the digital identity construct database 110 such that the second user attributes received by the second user device 102 from the digital identity construct database 110 are similarly current or up-to-date. The third authentication credentials may be, as described above with reference to FIG. 3, be based upon any mathematical transformation based on the numerical values of the determined attributes for the second user.

Thereafter, as shown in operation 606, the apparatus (e.g., computing device 200) includes means, such as processor 202 or the like, for authenticating the first user based upon the third authentication credentials, the second authentication credentials, and the first authentication credentials. By way of example, the computing device 200 may perform the same or substantially the same operations of FIG. 3 with regard to a second user and second user device 106 including, if necessary, forecasting or projection operations with regard to the dynamic user attributes associated with the second user. In doing so, the computing device 200 may operate to further increase the assurance associated with the offline authentication operations described herein. Although described herein with reference to a second user and second user device 106, the present disclosure contemplates that any number of user devices and/or associated users may be used (e.g., a third user, third user device, etc.) to further increase the assurances of the operations described herein.

Figure 7:
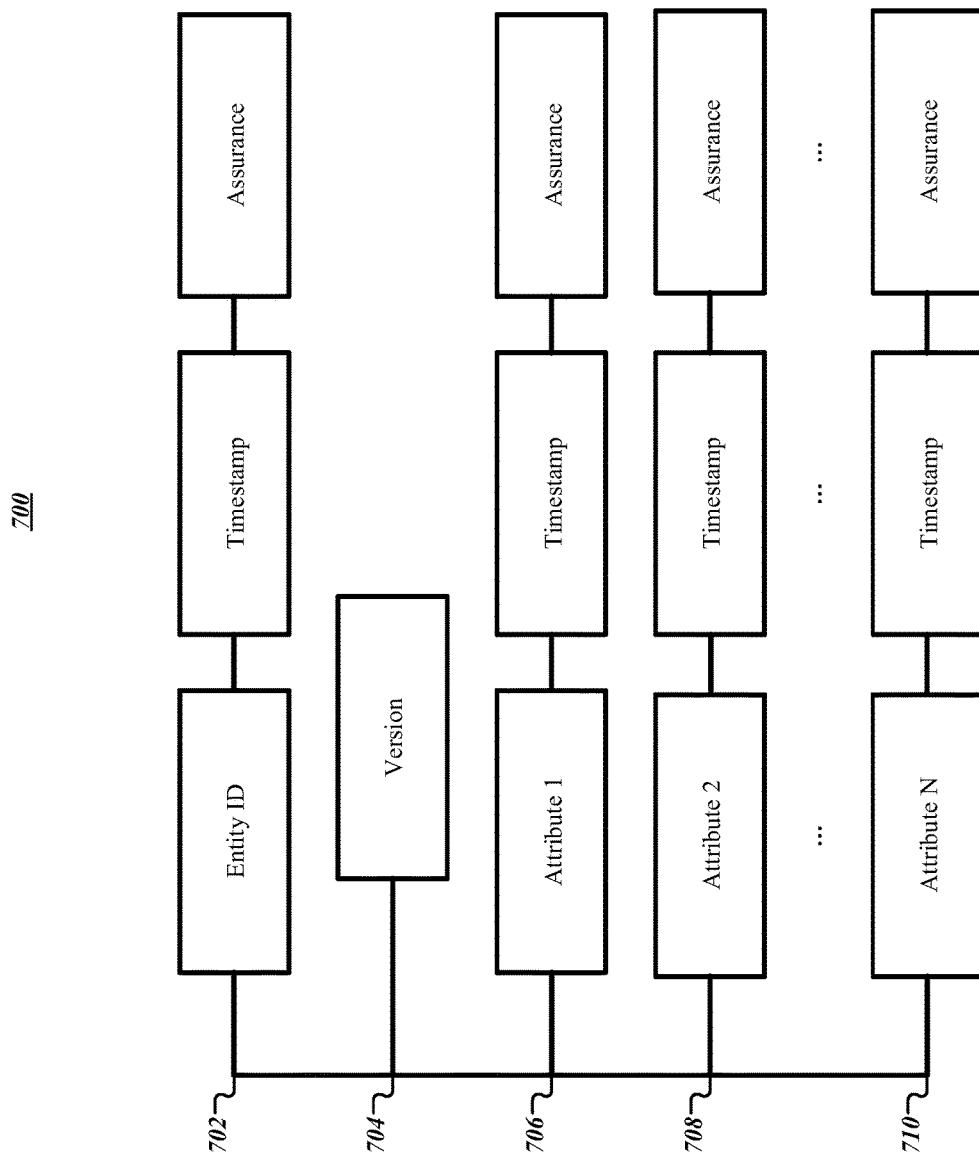
FIG. 7 illustrates a visual representation of an example digital identity construct configuration, in accordance with some example embodiments described herein.

With reference to FIG. 7, a visual representation of an example digital identity construct configuration 700 (e.g., an example representation of one potential version of the digital identity construct database 110) is shown. By way of a non-limiting example, the digital identity construct database 110 may be formed of a record header 702 that includes an entity identifier or identification, for example, a identifier associated with the first user and/or first user device 102. In some embodiments, the entity identifier (ID) may include propriety values or object identifiers (MD) and/or be registered with the Internet Assigned Numbers Authority (LANA). The record header 702 may further include a timestamp or time value associated with the version 704 of the digital identity construct database 700 that may, for example, represent the time at which the digital identity construct database 700 is accessed, updated, or the like. In some instances, the timestamp entry in the record header 702 may include a cumulative representation of the timestamp values associated with each attribute stored by the digital identity construct database 700. The record header may further include an assurance entry that is indicative of the cumulative assurance associated with attributes stored by the digital identity construct database 700 as described hereafter.

The example digital identity construct database 700 may include a plurality of user attribute (e.g., entity attribute) entries 706, 708, 710 associated with a first attribute, a second attribute, . . . , and an $N^{th}$ attribute. The first attribute entry 706 may include an associated timestamp indicative of the time at which the first attribute was received by the digital identity construct database 700. In some embodiments, this timestamp may instead refer to the time at which the first attribute entry 706 was generated. The first attribute entry 706 may further include an associated assurance or weight associated with the first attribute entry 706. As described above, the assurance may refer to a confidence associated with the first attribute entry 706. Similarly, the second first attribute entry 708 and the $N^{th}$ attribute entry 710 may include an associated timestamp indicative of the time at which the second attribute and the $N^{th}$ attribute, respectively, were received by the digital identity construct database 700. As above, in some embodiments, this timestamp may instead refer to the time at which the second attribute entry 708 and $N^{th}$ attribute entry 710, respectively, were generated. The second attribute entry 708 and the $N^{th}$ attribute entry may further include an associated assurance or weight associated with the second attribute entry 708 and the $N^{th}$ attribute entry 710, respectively. As described above, the present disclosure contemplates that the example digital identity construct database 700 may include any number of user attributes without limitation. Furthermore, the timestamp value for various attribute entries may vary (e.g., a current version of the database 700 may have today's date but one application entry may have a timestamp that is a week/a month old). Each request for authentication may accept or reject attribute entries based upon, for example, the timestamp and/or assurance associated with each attribute entry.

As described above, various technical challenges are surmounted via technical solutions contemplated herein. For example, embodiments of the present disclosure may operate to provide a mechanism for offline authentication based upon evolving user attributes. Said differently, embodiments described herein may detect an offline condition of an authenticating device (e.g., computing device of the present disclosure) and authenticate a user in the absence of network connectivity (e.g., when updated authentication credentials are unavailable). These new offline authentication techniques may further leverage device interconnectivity, such as between multiple users and associated devices, to further increase the assurance associated with an authentication protocol. For example, in instances in which networking connectivity is absent, authentication credentials of additional users associated with the requesting user may be leveraged to ensure proper user verification.

FIGS. 3-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for offline authentication, the method comprising:
receiving, by a computing device, a request for authentication from a first user device associated with a first user,
wherein the request comprises first authentication credentials generated based upon one or more user attributes retrieved by the first user device from a digital identity construct database at a first time; and
wherein the one or more user attributes comprise at least:
one static attribute, wherein static attributes comprise attributes of the first user that remain constant over time; and
one dynamic attribute, wherein dynamic attributes comprise attributes of the first user that vary over time;
determining an offline condition of the computing device at the first time;
obtaining, by the computing device, second authentication credentials associated with the first user, wherein the second authentication credentials are based upon one or more user attributes retrieved by the computing device from the digital identity construct database at a second time, wherein the first time is later in time than the second time;
determining, by the computing device, a discrepancy between the first authentication credentials and the second authentication credentials; and
authenticating, by the computing device, the first user based upon a forecast operation between the second authentication credentials and the first authentication credentials.

2. The computer-implemented method according to claim 1, wherein the second authentication credentials are based upon at least one previously acquired iteration of the at least one static attribute of the first authentication credentials and at least one previously acquired iteration of the at least one dynamic attribute of the first authentication credentials.

3. The computer-implemented method according to claim 2, wherein the forecasting operation comprises:
   determining a time difference between the first time and the second time; and
   projecting the at least one dynamic attribute of the first authentication credentials based upon the time difference and the at least one previously acquired iteration of the at least one dynamic attribute as used by the second authentication credentials.

4. The computer-implemented method according to claim 1, wherein determining the offline condition of the computing device further comprises:
   generating, by the computing device, a request for updated credentials;
   attempting to transmit the request to the digital identity construct database; and
   determining the offline condition in an instance in which a transmission failure is determined.

5. The computer-implemented method according to claim 4, wherein the request for updated credentials comprises a request for one or more user attributes from the digital identity construct database at the first time.

6. The computer-implemented method according to claim 1, further comprising:
   detecting, by the computing device, a second user device associated with a second user, wherein the second user device is proximate the first user device;
   receiving third authentication credentials generated based upon one or more user attributes retrieved by the second user device from a digital identity construct database at a first time; and
   authenticating, by the computing device, the first user based upon the third authentication credentials, the second authentication credentials, and the first authentication credentials.

7. The computer-implemented method according to claim 1, wherein the computing device is associated with an access location, the method further comprising providing access to the access location in response to authenticating the first user.

8. An apparatus for offline authentication comprising at least one processor and at least one memory, the at least one memory having computer-code instructed stored thereon that, in execution with the at least one processor, configure the apparatus to:
   receive a request for authentication from a first user device associated with a first user,
      wherein the request comprises first authentication credentials generated based upon one or more user attributes retrieved by the first user device from a digital identity construct database at a first time; and
      wherein the one or more user attributes comprise at least:
         one static attribute, wherein static attributes comprise attributes of the first user that remain constant over time; and
         one dynamic attribute, wherein dynamic attributes comprise attributes of the first user that vary over time;
   determine an offline condition of the apparatus at the first time;
   obtain second authentication credentials associated with the first user, wherein the second authentication credentials are based upon one or more user attributes retrieved by the apparatus from the digital identity construct database at a second time, wherein the first time is later in time than the second time;
   determine a discrepancy between the first authentication credentials and the second authentication credentials; and
   authenticate the first user based upon a forecast operation between the second authentication credentials and the first authentication credentials.

9. The apparatus according to claim 8, wherein the second authentication credentials are based upon at least one previously acquired iteration of the at least one static attribute of the first authentication credentials and at least one previously acquired iteration of the at least one dynamic attribute of the first authentication credentials.

10. The apparatus according to claim 9, wherein, in performing a forecasting operation, is further configured to:
    determine a time difference between the first time and the second time; and
    project the at least one dynamic attribute of the first authentication credentials based upon the time difference and the at least one previously acquired iteration of the at least one dynamic attribute as used by the second authentication credentials.

11. The apparatus according to claim 8, wherein, in determining the offline condition, is further configured to:
    generate a request for updated credentials;
    attempt to transmit the request to the digital identity construct database; and
    determine the offline condition in an instance in which a transmission failure is determined.

12. The apparatus according to claim 11, wherein the request for updated credentials comprises a request for one or more user attributes from the digital identity construct database at the first time.

13. The apparatus according to claim 8, further configured to:
    detect a second user device associated with a second user, wherein the second user device is proximate the first user device;
    receive third authentication credentials generated based upon one or more user attributes retrieved by the second user device from a digital identity construct database at a first time; and
    authenticate the first user based upon the third authentication credentials, the second authentication credentials, and the first authentication credentials.

14. The apparatus according to claim 8, wherein the computing device is associated with an access location, the apparatus further configured to provide access to the access location in response to authenticating the first user.

15. A computer program product for offline authentication comprising at least one non-transitory computer-readable storage medium having computer program code thereon that, in execution with at least one processor, configures the computer program product for:
    receiving, by a computing device, a request for authentication from a first user device associated with a first user,
       wherein the request comprises first authentication credentials generated based upon one or more user attributes retrieved by the first user device from a digital identity construct database at a first time; and wherein the one or more user attributes comprise at least:
  one static attribute, wherein static attributes comprise attributes of the first user that remain constant over time; and
  one dynamic attribute, wherein dynamic attributes comprise attributes of the first user that vary over time;
determining an offline condition of the computing device at the first time;
obtaining, by the computing device, second authentication credentials associated with the first user, wherein the second authentication credentials are based upon one or more user attributes retrieved by the computing device from the digital identity construct database at a second time, wherein the first time is later in time than the second time;
determining, by the computing device, a discrepancy between the first authentication credentials and the second authentication credentials; and
authenticating, by the computing device, the first user based upon a forecast operation between the second authentication credentials and the first authentication credentials.

16. The computer program product according to claim 15, wherein the second authentication credentials are based upon at least one previously acquired iteration of the at least one static attribute of the first authentication credentials and at least one previously acquired iteration of the at least one dynamic attribute of the first authentication credentials.

17. The computer program product according to claim 16, wherein, in performing the forecasting operation, the computer program product is further configured for:
  determining a time difference between the first time and the second time; and
  projecting the at least one dynamic attribute of the first authentication credentials based upon the time difference and the at least one previously acquired iteration of the at least one dynamic attribute as used by the second authentication credentials.

18. The computer program product according to claim 15, wherein, in determining the offline condition of the computing device, the computer program product is further configured for:
  generating, by the computing device, a request for updated credentials;
  attempting to transmit the request to the digital identity construct database; and
  determining the offline condition in an instance in which a transmission failure is determined.

19. The computer program product according to claim 18, wherein the request for updated credentials comprises a request for one or more user attributes from the digital identity construct database at the first time.

20. The computer program product according to claim 15, wherein the computing device is associated with an access location, the computer program product further configured for providing access to the access location in response to authenticating the first user.

* * * * *